(12) United States Patent
Shuen

(10) Patent No.: US 6,195,832 B1
(45) Date of Patent: Mar. 6, 2001

(54) PRESSURIZING STRUCTURE FOR WINDSHIELD WIPER

(75) Inventor: Shun Tian Shuen, San Chung (TW)

(73) Assignee: Janchy Enterprise Co., Ltd., Taipei (TW)

( * ) Notice: Subject to any disclaimer, the term of this patent is extended or adjusted under 35 U.S.C. 154(b) by 0 days.

(21) Appl. No.: 09/438,519

(22) Filed: Nov. 12, 1999

(51) Int. Cl.[7] ........................................ B60S 1/32
(52) U.S. Cl. ........................ 15/250.201; 15/250.351; 15/257.01; 15/250.001
(58) Field of Search ................ 15/250.351, 250.352, 15/250.201, 250.19, 250.361, 257.01, 250.001; D12/219, 220

(56) References Cited

U.S. PATENT DOCUMENTS

| | | | |
|---|---|---|---|
| 3,105,990 | * 10/1963 | Harris, Jr. et al. | 15/250.351 |
| 3,160,906 | * 12/1964 | Morena | 15/250.351 |
| 3,263,261 | * 8/1966 | Schulz | 15/250.351 |
| 5,081,736 | * 1/1992 | Schon | 15/250.351 |

FOREIGN PATENT DOCUMENTS

2652325 * 3/1991 (FR) .............................. 15/250.351

* cited by examiner

Primary Examiner—Gary K. Graham
(74) Attorney, Agent, or Firm—Bacon & Thomas, PLLC

(57) ABSTRACT

A pressurizing structure for windshield wiper, including a frame body and a connecting member. The frame body is formed with a channel in which a wiper arm is inserted. A decorative block and a retaining plate are locked on the surface of the frame body. The retaining plate serves to increase the force application area of the wiper so as to keep the blade of the wiper arm parallel to the windshield. Fastening straps are passed through two side walls of the frame body for fastening the wiper arm. The bottom face of the frame body is disposed with a resilient support plate for more firmly fixing the wiper arm with the frame body. Slide channels are formed at the rear end of the frame body for slidably connecting with the connecting member two sides of which are formed with ribs. A cover body is connected to the rear end of the connecting member. The frame body and the cover body are connected by the telescopic connecting member so that the pressurizing structure is applicable to different specifications of wiper arms.

3 Claims, 6 Drawing Sheets

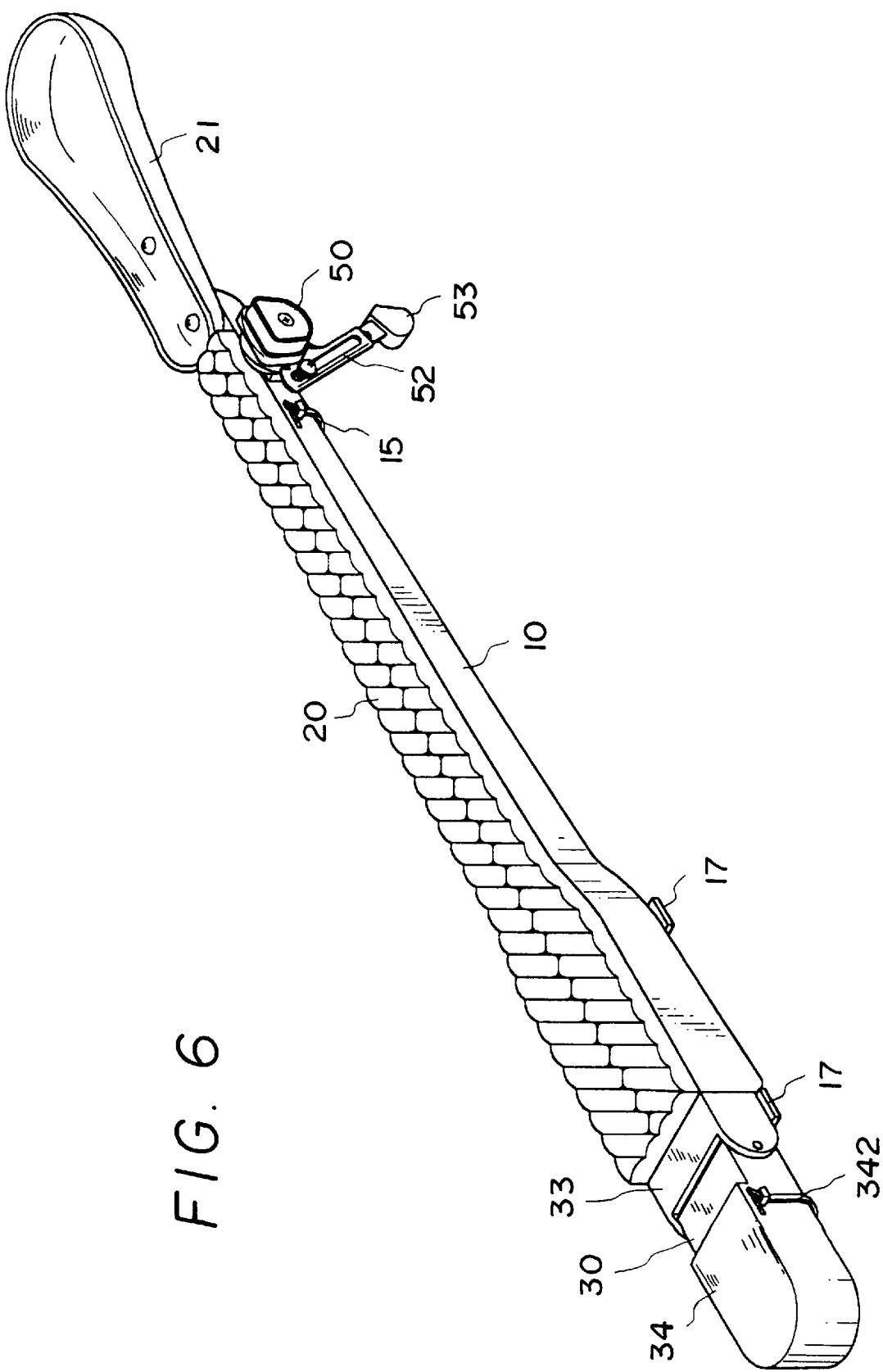

PRESSURIZING STRUCTURE FOR WINDSHIELD WIPER

BACKGROUND OF THE INVENTION

The present invention relates to a pressurizing structure for windshield wiper, which is able to keep the blade of the wiper tightly attaching to the windshield and achieve a decorative effect. The pressurizing structure is applicable to various specifications of windshield wipers of various types of cars.

A conventional car windshield wiper is reciprocally moved to wipe off the water on the windshield via the blade of the wiper arm. The wiper arm is connected to a driving shaft by a simple resilient clip structure. The wiper arm can be folded into a position perpendicular to the windshield for a user to clean the windshield or replace the wiper arm. After a long period of use, elastic failure of the resilient clip may take place. This will result in that the blade cannot be positioned in parallel to the windshield and thus the water on the windshield can be hardly completely wiped off. The conventional windshield wiper only serves to wipe the windshield so that the appearance of the windshield wiper is often not specifically considered in manufacturing. Also, the wiper arm is generally made of metallic material and is subject to rusting.

SUMMARY OF THE INVENTION

It is therefore a primary object of the present invention to provide to a pressurizing structure for windshield wiper, which is able to keep the blade of the wiper tightly attaching to the windshield so as to effectively wipe off the water on the windshield.

It is a further object of the present invention to provide the above pressurizing structure which is applicable to various specifications of windshield wipers.

It is still a further object of the present invention to provide the above pressurizing structure which can highlight personal style and achieve a decorative effect.

The present invention can be best understood through the following description and accompanying drawings wherein:

BRIEF DESCRIPTION OF THE DRAWINGS

FIG. 6 shows another embodiment of the present invention.

DETAILED DESCRIPTION OF THE PREFERRED EMBODIMENTS

Figure 1:
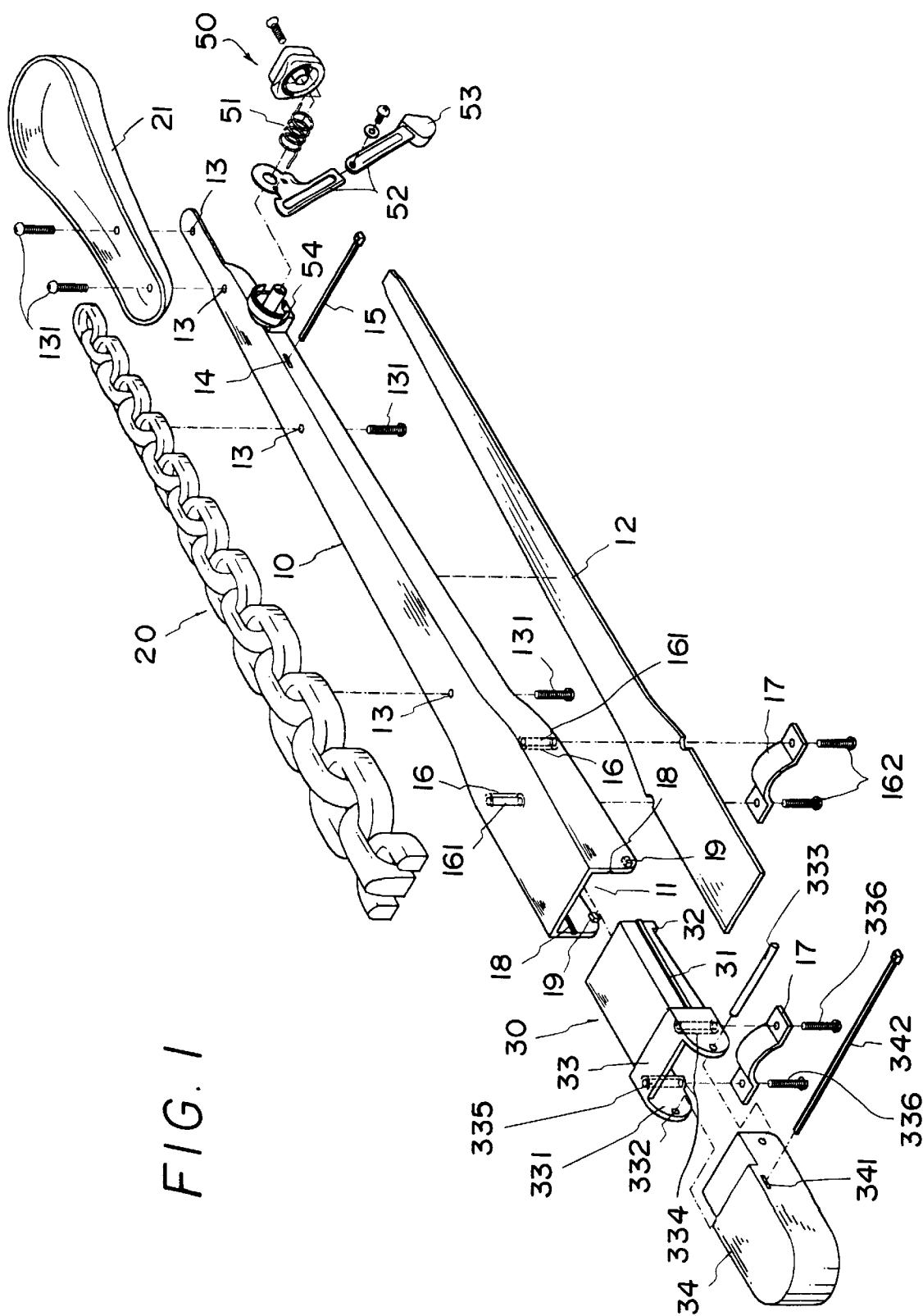
FIG. 1 is a perspective exploded view of the present invention.
Figure 2:
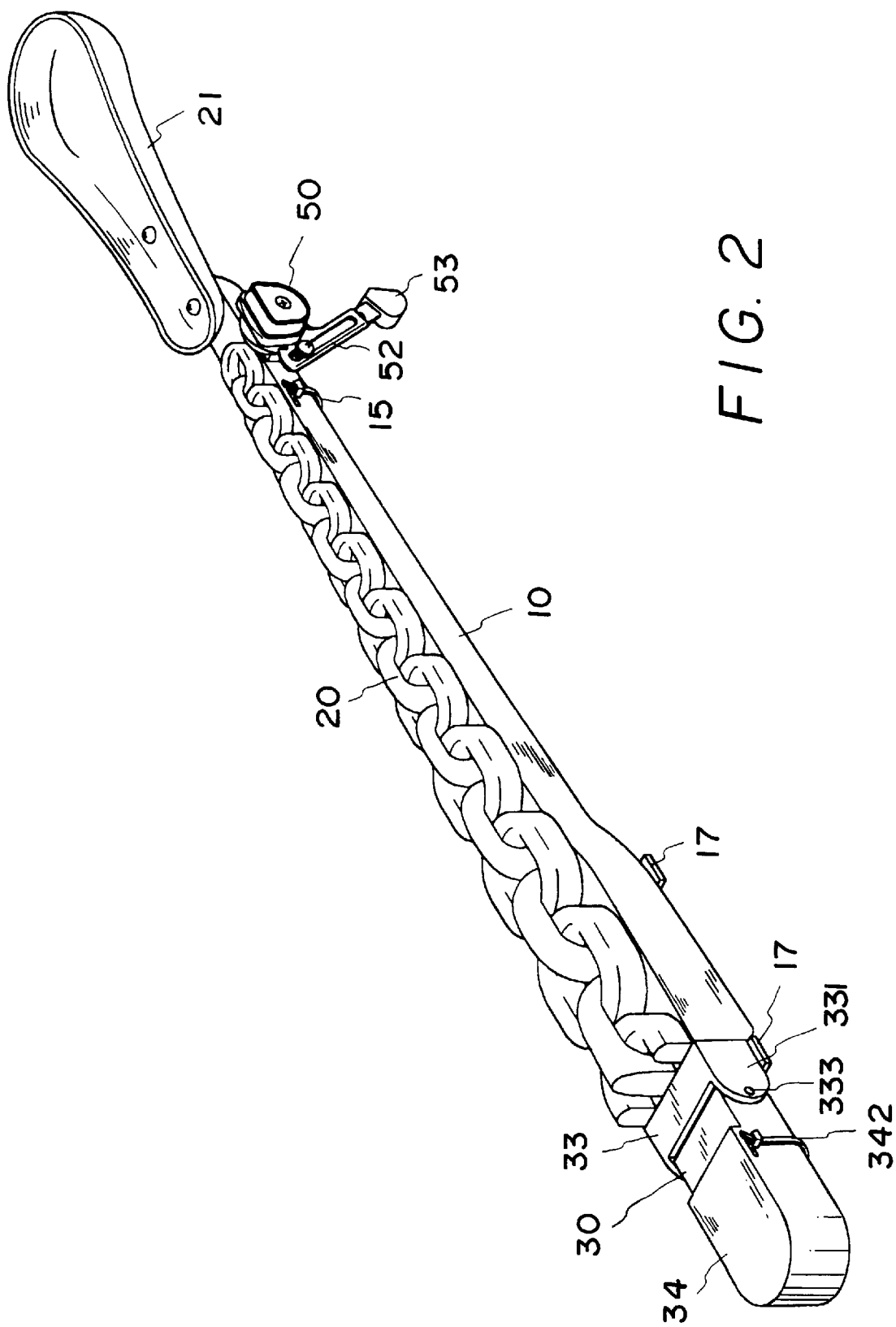
FIG. 2 is a perspective assembled view of the present invention.

Please refer to FIGS. 1 and 2. The pressurizing structure for windshield wiper of the present invention includes:

an elongated tapering frame body 10 formed with a channel 11 in which a wiper arm 40 is inserted, the inner side of the channel 11 being disposed with a double-face tape 12 for firmly associating the wiper arm 40 with the frame body 10, the surface of the frame body 10 being formed with through holes 13 through which screws 131 are passed to lock a decorative block 20 and a retaining plate 21, the retaining plate 21 being a substantially semi-bottle gourd shaped body, two sides of the frame body 10 near front end thereof being formed with through holes 14 through which a fastening strap 15 is passed for preventing the wiper arm 40 from detaching from the frame body 10, inner walls of two sides of the frame body near the rear end thereof being disposed with opposite projecting columns 16 formed with thread holes 161, screws 162 being screwed into the thread holes 161 for locking a resilient support plate 17, slide channels 18 being formed behind the projections 16, stopper blocks 19 being disposed on lower sides of the slide channels 18;

a retaining block 50 locked on a lateral wall of the frame body 10 near the front end, a resilient body 51 being fixedly disposed in the retaining block 50, the retaining block 50 being further disposed with an adjustment lever 52, the front end of the adjustment lever 52 being disposed with a soft plastic pad 53, a screw being passed through the adjustment lever 52 to lock and locate the adjustment lever, the retaining block 50 being formed with an engaging groove 54 for engaging with the adjustment lever 52 to provide a retaining effect, whereby when the wiper arm 40 is still, the wiper arm 40 is kept not in contact with the windshield and when the wiper arm 40 is activated and shifted, the adjustment lever 52 will be disengaged from the engaging groove 54 and restored by the resilient body 51 to a position parallel to the frame body 10 without affecting the operation of the wiper arm 40; and a connecting member 30 two sides of which are formed with ribs 31 for slidably inserting into the slide channels 18, the bottom side of the connecting member 30 being formed with a slope face, the end of the slope face being formed with a restricting projection 32, a rear end of the connecting member 30 being disposed with a pivot section 33 having two opposite lugs 331, each lug 331 being formed with a circular hole 332, an insertion pin 333 being passed through the circular holes 332 to connect with a cover body 34, the inner faces of the two lugs 331 being disposed with two opposite projecting columns 334 formed with thread holes 335, screws 336 being screwed into the thread holes 335 to lock a resilient support plate 17, two side walls of the cover body 34 being formed with opposite through holes 341 through which a fastening strap 342 is passed.

According to the above structure, when assembled, the front end of the connecting member 30 is inserted into the rear end of the frame body 10 with the ribs 31 slidably fitted in the slide channels 18, whereby the connecting member 30 can be extended or retracted. Also, by means of the restricting projection 32 and the stopper block 19, the connecting member 30 is prevented from detaching from the frame body 10.

Figure 3:
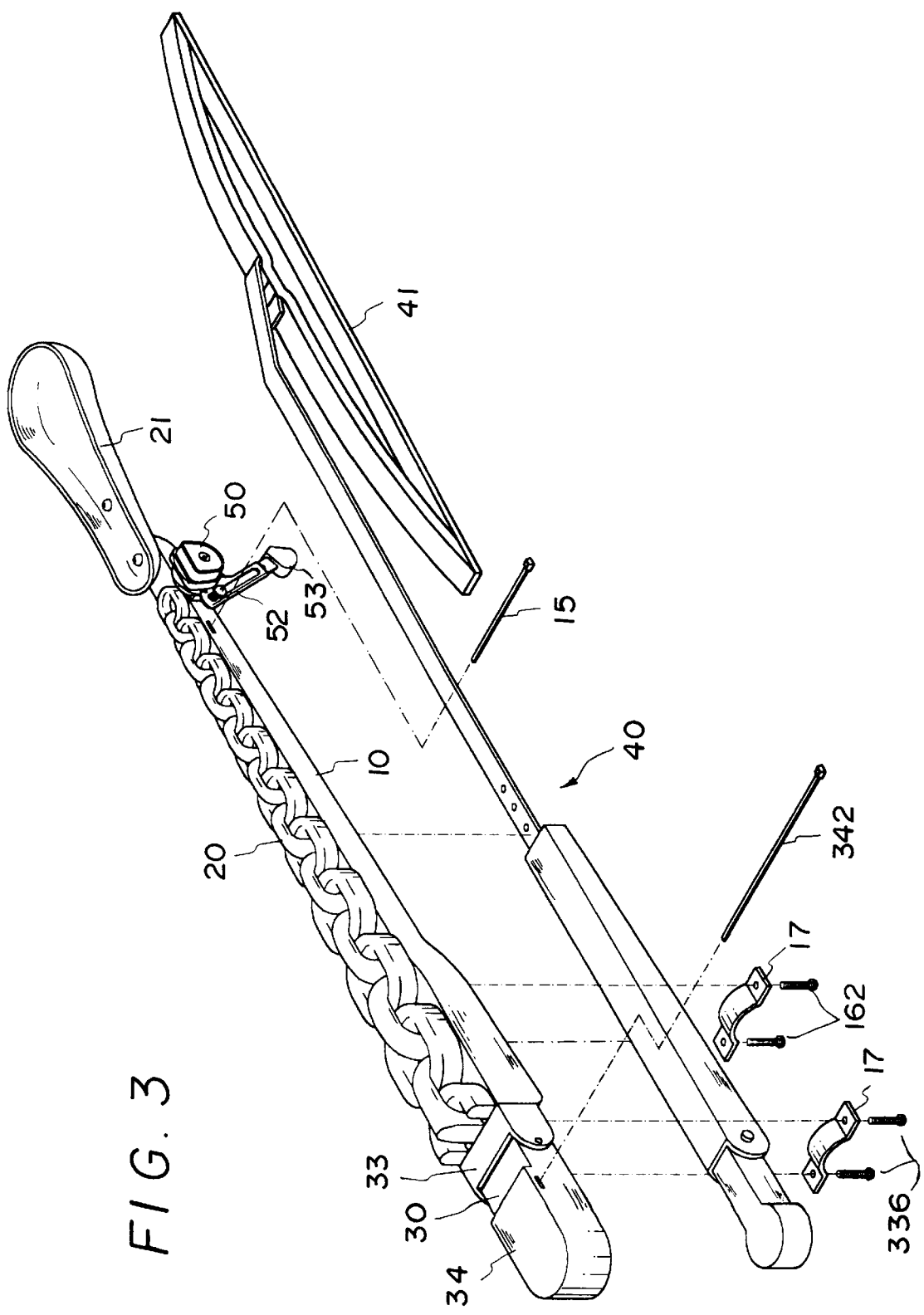
FIG. 3 shows that the wiper arm is to be inserted into the pressurizing structure of the present invention.
Figure 4:
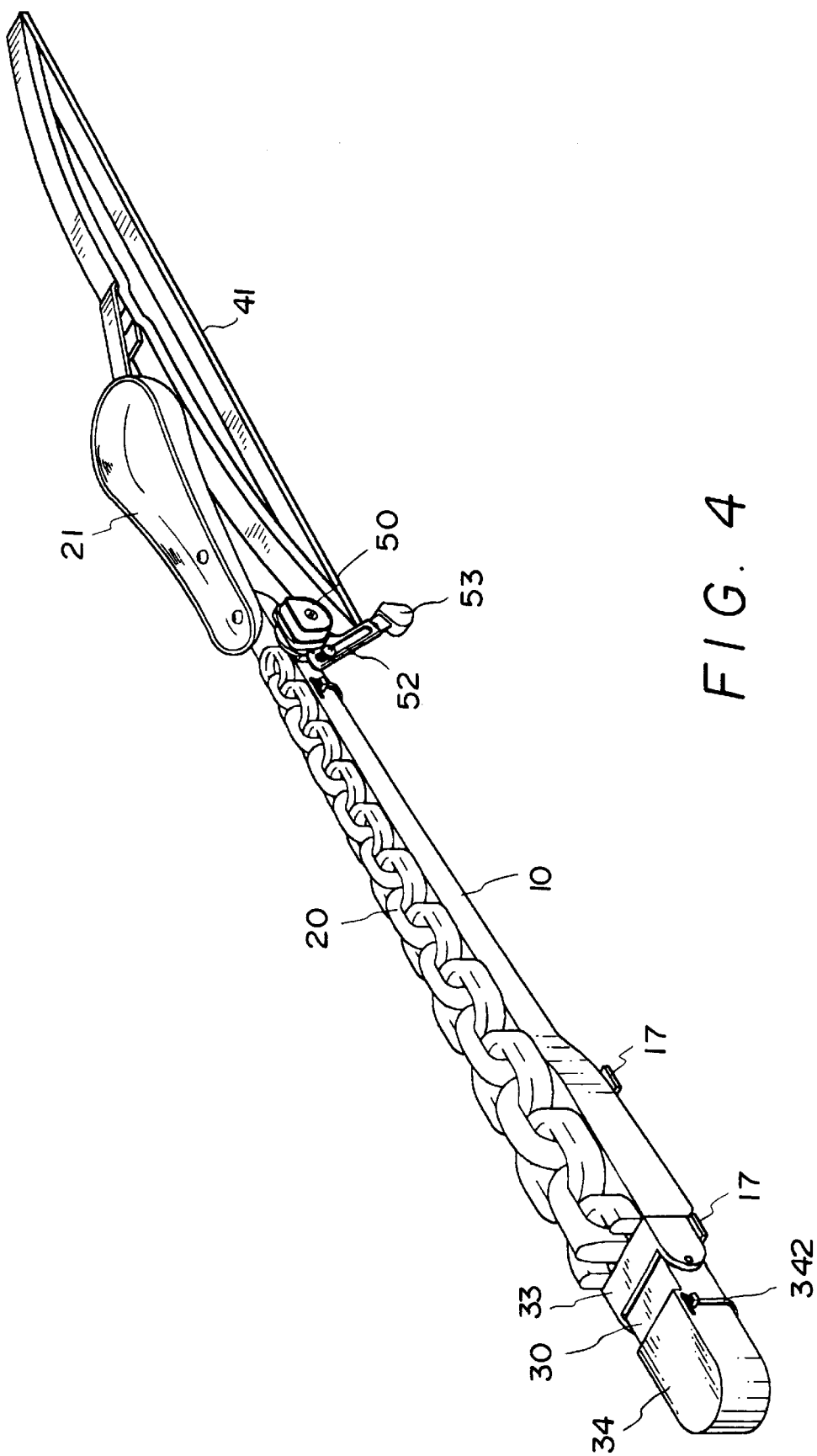
FIG. 4 shows that the wiper arm is inserted into the pressurizing structure of the present invention.

Referring to FIG. 3, when assembled, the frame body 10 is first associated with the wiper arm 40. The double-face tape 12 on inner side of the frame body 10 serves to adhere and fix the wiper arm 40 to the frame body 1. Then, the fastening straps 15, 342 passing through the frame body 10 and the cover body 34 are wound around the wiper arm 40 to fasten and locate the same. Finally, the resilient support plates 17 upward lock the wiper arm 40 from the bottom face thereof to complete the assembly as shown in FIG. 4. A general wiper arm 40 is tapered from rear end to front end to form a conic front end and the resilient clip is disposed at the rear end. Therefore, with respect to the total weight, the front end section is lighter. By means of the retaining plate 21 at the front end of the frame body 10, during running, the area under the wind pressure is increased so that the blade 41 of the wiper arm 40 is kept in parallel to the windshield. This helps in cleaning the windshield.

Figure 5:
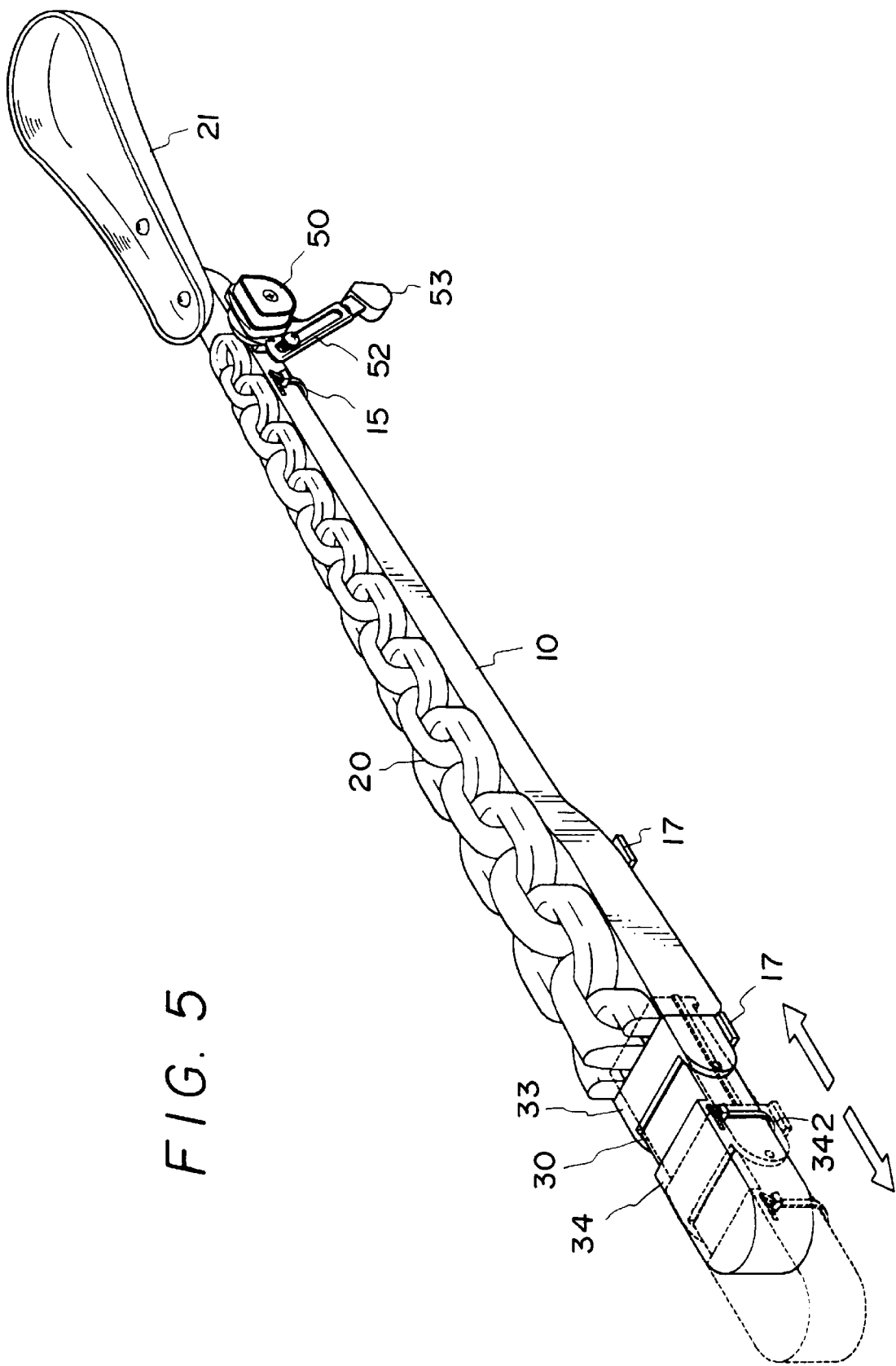
FIG. 5 shows the telescoping operation of the present invention.

Referring to FIG. 5, different modes of cars are equipped with different lengths of wiper arms 40. In order to widely apply the present invention to most of the cars, the frame body 10 and the cover body 34 are telescopically connected.

Referring to FIG. 6, in order to highlight personal style and achieve a decorative effect, the decorative block 20 is replaceably disposed on the surface of the frame body 10 so as to achieve versatile patterns.

According to the above arrangement, the present invention has the following advantages;

1. The area under the wind pressure at front end of the wiper is increased so that the blade can be kept in parallel to the windshield. This helps in cleaning the windshield and provides more clear sight for the driver.
2. The frame body and the cover body are connected by a telescopic connecting member so that the pressurizing structure is applicable to different specifications of wiper arms.
3. The decorative block on the surface of the wiper can be replaced in accordance with personal desire so as to highlight personal style and achieve a beautifying effect.

The above embodiments are only used to illustrate the present invention, not intended to limit the scope thereof. Many modifications of the above embodiments can be made without departing from the spirit of the present invention.

What is claimed is:

1. A pressurizing structure for a windshield wiper arm, comprising:

an elongated, U-shaped frame body having side walls interconnected by a top wall to form a channel therein in which a wiper arm is insertable, the body tapers from a first end to a second end, an inner side of the channel being disposed with a double-face tape, a decorative block and a retaining plate being locked on an outer surface of the frame body, an inner surface of the top wall of the frame body near the first end thereof being disposed with spaced projecting columns formed with thread holes, screws are screwed into the thread holes and lock a resilient support plate thereto, slide channels are formed in said side walls extending from said first end, stopper blocks are disposed on lower sides of said side walls below the slide channels; and a connecting member, two sides of which are formed with ribs for slidably inserting into the slide channels, a bottom side of the connecting member being formed with a slope face, an end of the slope face being formed with a restricting projection, a rear end of the connecting member being disposed with a pivot section having two spaced lugs, each lug being formed with a circular hole, an insertion pin is passed through the circular holes to connect with a cover body, whereby the wiper arm is insertable into the frame body of the pressurizing structure and is adapted to be adhered thereto by the double-face tape, the retaining plate serving to increase a force application area of the front end of the wiper arm so as to keep the wiper arm parallel to a windshield to be wiped.

2. A pressurizing structure for a windshield wiper arm as claimed in claim 1, wherein the frame body is formed with opposite through holes near the second end thereof and two side walls of the cover body are formed with opposite through holes, fastening straps are passed through the through holes to fasten the wiper arm with the frame body and prevent the wiper arm from detaching therefrom.

3. A pressurizing structure for a windshield wiper arm as claimed in claim 1, wherein inner faces of the lugs of the connecting member are formed with two projecting columns, each projecting column being formed with a thread hole, a screw being screwed into the thread hole to lock a resilient support plate for supporting and more firmly connecting the wiper arm with the pressurizing structure.

* * * * *